(12) United States Patent
Neulight

(10) Patent No.: US 7,801,752 B2
(45) Date of Patent: Sep. 21, 2010

(54) METHOD, APPARATUS, AND PROGRAM FOR PRE-SELLING TICKETS TO EFFECT A BOOKING OF AN EVENT

(75) Inventor: Joseph Neulight, Toluca Lake, CA (US)

(73) Assignee: IMDB.COM, Inc., Seattle, WA (US)

( * ) Notice: Subject to any disclaimer, the term of this patent is extended or adjusted under 35 U.S.C. 154(b) by 598 days.

(21) Appl. No.: 11/379,542

(22) Filed: Apr. 20, 2006

(65) Prior Publication Data

US 2007/0250354 A1 Oct. 25, 2007

(51) Int. Cl.
*G06Q 10/00* (2006.01)

(52) U.S. Cl. .............................. 705/5; 705/6

(58) Field of Classification Search ................. 705/5–6
See application file for complete search history.

(56) References Cited

U.S. PATENT DOCUMENTS

| | | | |
|---|---|---|---|
| 4,931,932 A | 6/1990 | Dalnekoff et al. | |
| 5,333,257 A | 7/1994 | Merrill et al. | |
| 5,797,127 A | 8/1998 | Walker et al. | |
| 6,910,627 B1 | 6/2005 | Simpson-Young et al. | |
| 7,108,173 B1* | 9/2006 | Wang et al. | 235/377 |
| 7,127,408 B2* | 10/2006 | Rosen | 705/6 |
| 2002/0099642 A1* | 7/2002 | Schwankl et al. | 705/37 |
| 2002/0103849 A1* | 8/2002 | Smith | 709/201 |
| 2002/0133381 A1* | 9/2002 | Tso | 705/5 |
| 2002/0169694 A1 | 11/2002 | Stone et al. | |
| 2002/0178034 A1* | 11/2002 | Gardner et al. | 705/5 |
| 2003/0069810 A1 | 4/2003 | Gathman et al. | |
| 2003/0097307 A1 | 5/2003 | Greene | |
| 2003/0154169 A1 | 8/2003 | Yanai | |
| 2003/0171985 A1 | 9/2003 | Prabhu et al. | |
| 2003/0187802 A1* | 10/2003 | Booth | 705/59 |
| 2004/0030568 A1 | 2/2004 | Kocznar et al. | |
| 2004/0049432 A1 | 3/2004 | Beljakovic et al. | |
| 2004/0059643 A1* | 3/2004 | Marti | 705/26 |
| 2005/0033615 A1* | 2/2005 | Nguyen et al. | 705/5 |
| 2006/0010023 A1* | 1/2006 | Tromczynski et al. | 705/8 |
| 2006/0041443 A1* | 2/2006 | Horvath | 705/1 |
| 2007/0066397 A1* | 3/2007 | Nammi et al. | 463/42 |
| 2007/0156441 A1* | 7/2007 | Tupper | 705/1 |
| 2007/0245351 A1* | 10/2007 | Sussman et al. | 718/104 |
| 2007/0265915 A1* | 11/2007 | Gould et al. | 705/14 |

OTHER PUBLICATIONS

Fisher, Eric et al., "Pittsburgh Dance Show Canceled", Apr. 15, 2000, Washington Times, p. C5.*
International Search Report mailed on May 17, 2007, for International Application No. PCT/US06/39926 filed on Oct. 10, 2006, 1 page.

* cited by examiner

*Primary Examiner*—John W Hayes
*Assistant Examiner*—Fadey S Jabr
(74) *Attorney, Agent, or Firm*—Townsend and Townsend and Crew LLP

(57) ABSTRACT

An apparatus, method, and program for pre-selling tickets to determine whether to book an event or activity, and for facilitating the sale of those tickets. Consumers who pre-purchase a ticket are plainly notified if an event has not yet been booked. They are also shown the progress toward the likely booking of the event. A successful pre-sale of tickets triggers the booking of the event. An unsuccessful pre-sale results in the event not being booked. Consumers who help effect an event booking may be given privileges over those who purchase traditional tickets for the same event after it has already been booked.

10 Claims, 6 Drawing Sheets

BINDING TICKET PURCHASE AGREEMENT

CHECKOUT NOW → $125.00

ACCOUNT NUMBER

ACCOUNT EXPIRATION

ACCOUNT NAME

BILLING ADDRESS

This is a Binding Agreement to purchase tickets, if, and only if, the Critical Mass of 100 tickets is reached by February 28, 2006.

Your account will not be charged unless and until the Critical Mass is achieved. These tickets are non-refundable and this agreement to purchase tickets is irrevocable, except as specified by law.

☐ I agree to the Terms and Conditions...
CANCEL or CONTINUE

FIG. 8

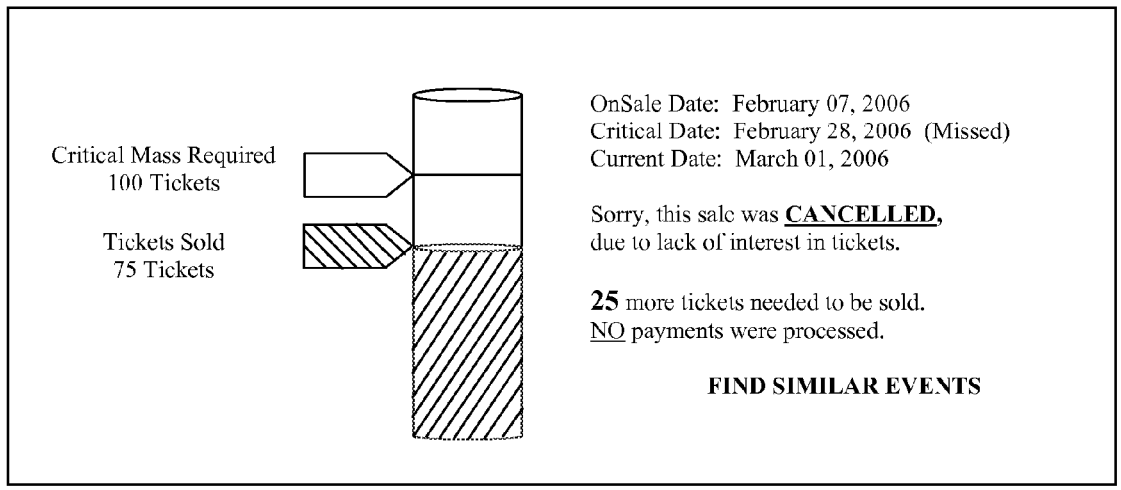

Critical Mass Required
100 Tickets

Tickets Sold
75 Tickets

OnSale Date: February 07, 2006
Critical Date: February 28, 2006 (Missed)
Current Date: March 01, 2006

Sorry, this sale was CANCELLED,
due to lack of interest in tickets.

25 more tickets needed to be sold.
NO payments were processed.

FIND SIMILAR EVENTS

FIG. 9

METHOD, APPARATUS, AND PROGRAM FOR PRE-SELLING TICKETS TO EFFECT A BOOKING OF AN EVENT

FIELD OF THE INVENTION

The present invention relates to the field of ticket sales and event booking. In particular, the present invention relates to conditional booking of an event, activity, or travel engagement.

BACKGROUND OF THE INVENTION

In the current market for tickets, promoters book events in advance of ticket sales based on market studies or assumptions. The general assumption in booking is that enough tickets will be sold to support a profitable event. However, for various reasons, a market may not respond as favorably as predicted once tickets go on-sale, leaving promoters with unmet expectations or a financial loss.

Likewise, as a result of market studies and assumptions, promoters may bypass or overlook a given market because it is presumed or proven to have little or no commercial promise of supporting a given event or type of event. This presumed or proven lack of interest by consumers leaves certain markets perennially underserved.

Accordingly, it would be desirable for the present invention to facilitate a guaranteed and highly controlled pre-sale of tickets prior to booking an event with a venue or exhibitor. It is another desire of the invention to assure promoters of a satisfactory return on their investment, thus reducing or eliminating altogether the financial risk of an unsold or undersold booking. It is a further desire of the invention to allow consumers to prove to promoters that there is sufficient interest to warrant a given booking, contrary to previous market assumptions. It is also a desire of the invention to allow consumers with a personal or civic interest to help a promoter market an event in order to get that event booked.

Further desires of the invention will become apparent from the following description.

SUMMARY OF THE INVENTION

The embodiments of the present invention solve the problems and address the drawbacks of the approaches in the above description. An embodiment of the present invention is a method of determining a booking of an event by pre-selling admission tickets to the event using a central ticket controller linked to at least one computer processor. The preferred method comprising the steps of: inputting a critical mass criteria, inputting a critical date criteria, accessing the computer processor to submit a customer request to purchase a ticket for future fulfillment, submitting the request to the central ticket controller, processing the request, and transmitting information relative to the pre-purchased ticket to the computer processor.

The Critical Mass may be defined as a number of tickets or cash value required to be pre-purchased to effect a booking of an event. The Critical Date may be defined as a date and time wherein the Critical Mass must be achieved to secure the booking of the event. A successful pre-sale of tickets may trigger the booking of the event. An unsuccessful pre-sale may result in the event not being booked.

Another embodiment of the present invention is a system for determining a booking of an event by pre-selling tickets to the event comprising: a central ticket controller linked to at least one or more external devices by a suitable system interface. The central ticket controller may be a webserver computer connected to a database with appropriate software to communicate with an external device and implement the methods above.

A further embodiment of the present invention may include Critical Blinds. A Critical Blind is information that is selectively withheld from customers.

These and other embodiments of the present invention are further made apparent, in the remainder of the present document, to those of ordinary skill in the art.

BRIEF DESCRIPTION OF DRAWINGS

In order to more fully describe embodiments of the present invention, reference is made to the accompanying drawings. These drawings are not to be considered limitations in the scope of the invention, but are merely illustrative.

FIG. 8 shows a display of a Binding Agreement of Sale prior to an event being booked according to an embodiment of the present invention.

FIG. 9 shows a display wherein the Critical Mass criteria was not met before the Critical Date criteria according to an embodiment of the present invention.

DETAILED DESCRIPTION OF SPECIFIC EMBODIMENTS

The description above and below and the drawings of the present document focus on one or more preferred embodiments of the present invention and also describe some exemplary optional features and/or alternative embodiments. The description and drawings are for the purpose of illustration and not limitation. Those of ordinary skill in the art will recognize variations, modifications, and alternatives. Such variations, modifications, and alternatives are also within the scope of the present invention. Section titles are terse and are for convenience only.

Figure 1:
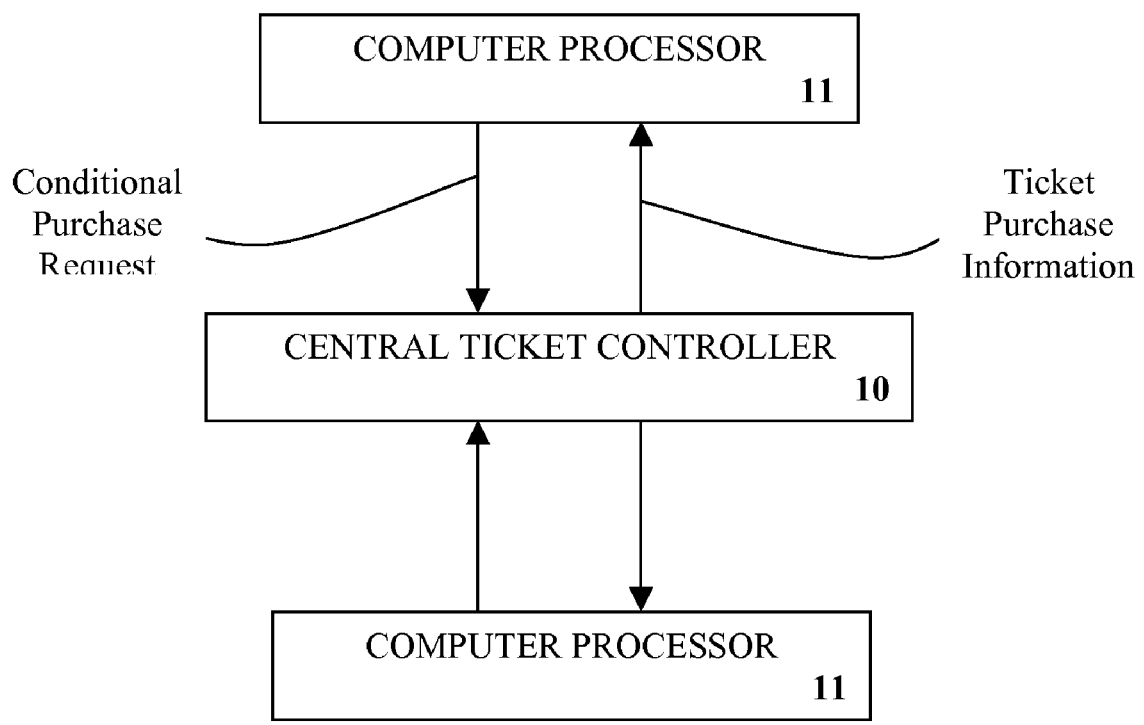
FIG. 1 shows an overall system block diagram of a preferred embodiment of the present invention.

Referring now to FIG. 1, there is shown an overall system block diagram of a preferred embodiment of the present invention. In this embodiment, a central ticket controller 10 may be linked to at least one or more computer processors 11 by a suitable system interface. Central ticket controller 10 may be adapted to communicate to external devices via a network connection, hard wire connection, wireless connection or any other connection, and provides customers access to central ticket controller 10 from locations worldwide, regardless of where the promoter or ticket agent has its primary place of business.

In one embodiment of the invention, the external device capable of communicating with central ticket controller may be an apparatus with a computer processor such as, but not limited to, a ticketing terminal, home computer, PDA, mobile phone, or telephone. The terminal may be adapted to receive a request to purchase a ticket for future fulfillment and then be capable of processing the request.

The system depicted in FIG. 1 may be embodied in hardware specifically provided to implement the present invention. Alternatively, the system may be implemented using the infrastructure that presently links existing ticketing agents with consumers/vendors. In particular, many ticketing agents are already linked to computerized reservation systems sponsored by various vendors. The hardware and communication links of these systems may be used as an infrastructure for the present invention. Changes to the existing system interfaces for pre-selling tickets to incorporate the subject invention may be accomplished in various ways, such as reprogramming an existing file server or by adding additional file servers. Alternatively, the subject invention may be implemented using existing hardware incorporating appropriate software updates. For example, the external device may be a personal computer executing a browser application to communicate with central ticket controller. Central ticket controller may be a webserver computer connected to a database with appropriate software to communicate with the external device and implement the methods below.

Figure 2:
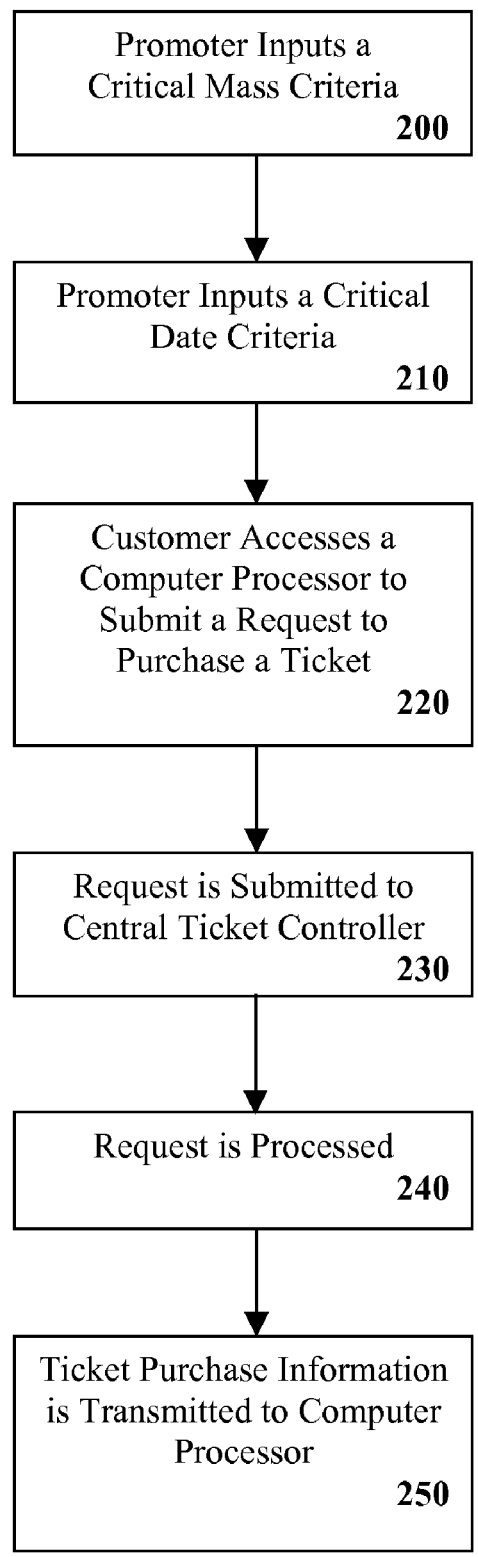
FIG. 2 shows a method overview of a preferred embodiment of the present invention.

Another embodiment of the present invention is a method of determining a booking of an event by pre-selling tickets for admission to the event using a central ticket controller linked to at least one computer processor. The preferred method, as shown in FIG. 2 comprises the steps of: inputting a critical mass criteria 200, inputting a critical date criteria 210, accessing the computer processor to submit a customer request to purchase a ticket for future fulfillment 220, submitting the request to the central ticket controller 230, processing the request 240, and transmitting information relative to the prepurchased ticket to the computer processor 250. The method can be applied not only to events, but to activities of any kind, provided that entry into them is regulated by the purchase of a ticket or secured reservation, including but not limited to, commercial travel engagements. Commercial travel engagements may include air, sea, or ground transportation.

Figure 3:
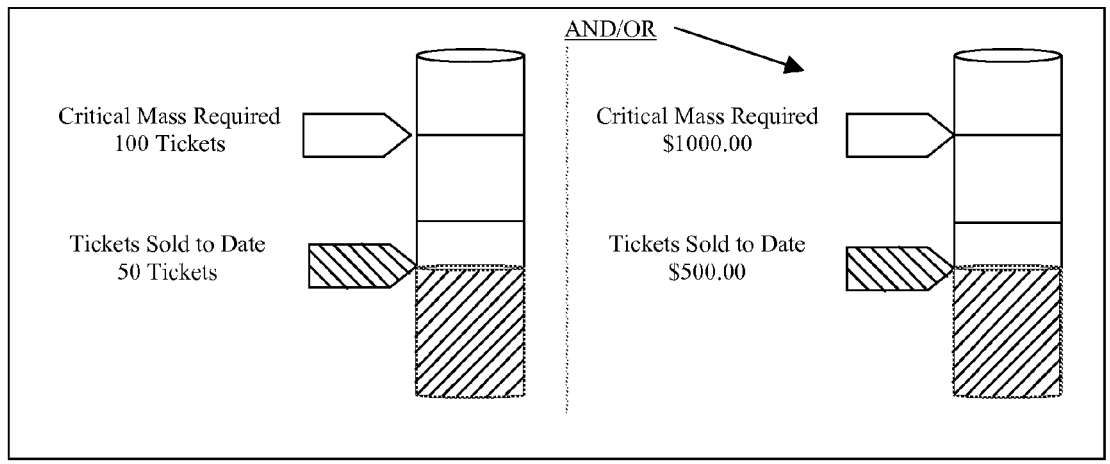
FIG. 3 shows a display of a graphical gauge illustrating a Critical Mass criteria according to an embodiment of the present invention.

Critical Mass criteria is defined as a number of tickets or a total cash value of tickets, or both. In either case, the Critical Mass may be displayed to consumers in a graphical gauge (such as a thermometer or dial), in relation to the total capacity or cash value of booking the entire venue, as shown in FIG. 3. In a preferred embodiment, a promoter may choose to set the Critical Mass at less than the capacity of the venue. Alternatively, the promoter may choose to set the Critical Mass equal to the capacity of the venue in which case the promoter is requiring a sold out event in order to effect a booking. In one example, the Critical Mass criteria may be set at 100 tickets, or at $1000. In another example, the Critical Mass may also be set at the earlier of 100 tickets or $1000. In yet another example, the Critical Mass criteria may also be set at both 100 tickets and $1000.

Figure 4:
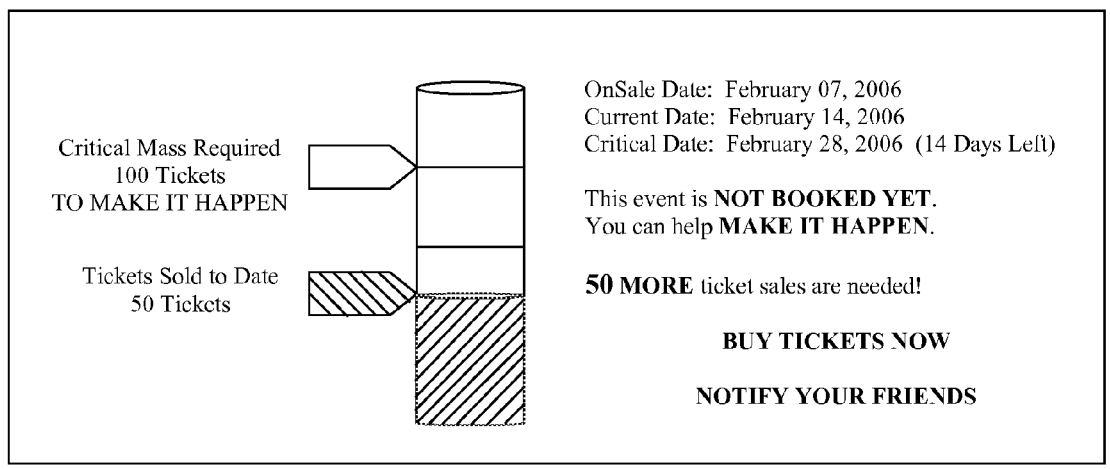
FIG. 4 shows a display of a graphical gauge illustrating the progress of a rising Critical Mass criteria in relation to the Critical Date criteria according to an embodiment of the present invention.
Figure 5:
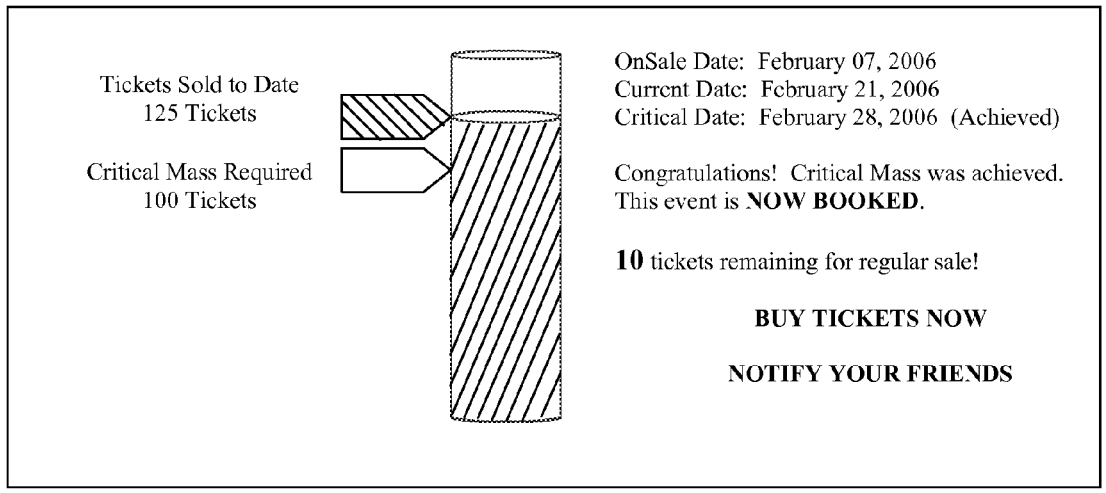
FIG. 5 shows a display that a Critical Mass criteria was achieved by the Critical Date criteria and tickets will be fulfilled to the consumer according to an embodiment of the present invention.

The Critical Date is defined as a date and time of day. An example of a Critical Date may be Feb. 28, 2006-9:00 am. Tickets may be put on sale any time prior to the Critical Date, but ideally with a reasonable amount of time for the Critical Mass to build so that a booking may be effected, which should be the honest intent of the promoter. The Critical Mass must be achieved prior to the Critical Date in order to book the event, as shown in FIG. 5. Consumers who attempt to purchase tickets prior to the Critical Mass being achieved may be plainly notified that the event has not yet been booked, as shown in FIG. 4. They may also be shown the progress toward the Critical Mass value in relation to the Critical Date, and their position in it.

A purchase transaction may be initiated from any one of computer processors 11 linked to central ticket controller 10. The information required to implement the transaction may be passed between any one of computer processors 11 and central ticket controller 10 until the transaction is complete. Central ticket controller 10 keeps track of all sales transactions in the system.

Figure 7:
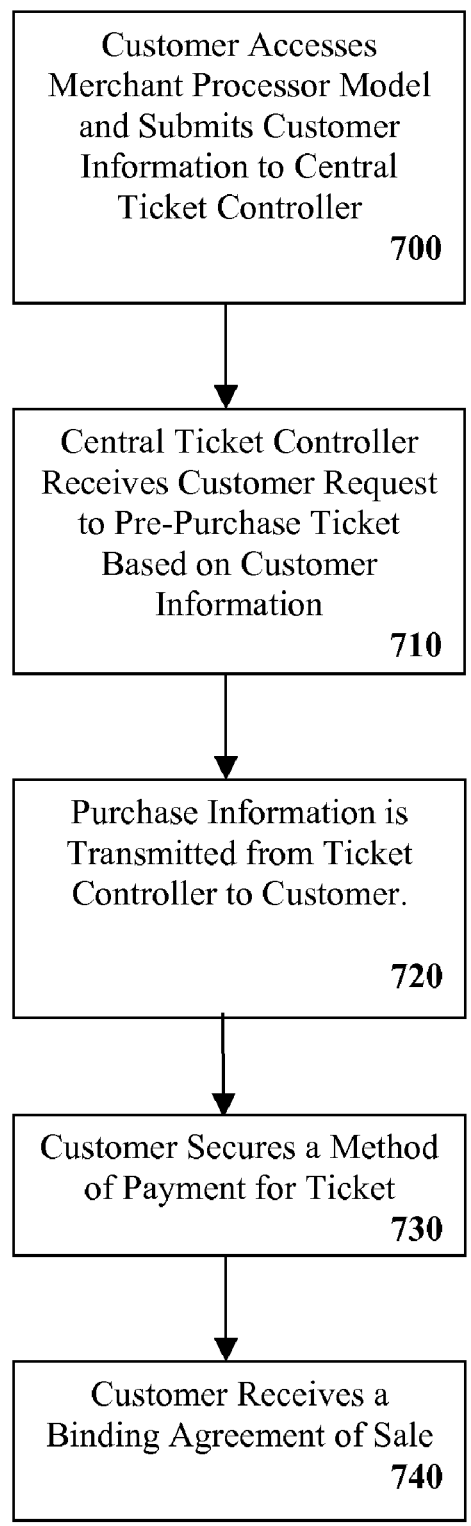
FIG. 7 shows a flow chart depicting the processing of a request to pre-purchase an admission ticket according to an embodiment of the present invention.

FIG. 7 is a flow chart depicting the processing of the customer request. The process starts when a customer accesses an on-line merchant processor model and submits customer information 700. Central ticket controller 10 receives the request to pre-purchase the ticket based on the information received from the customer together with the information from the on-line merchant model 710. The on-line merchant model may be an on-line shopping cart, or the like. After a purchase price is determined by central ticker controller 10, it may be transmitted to the customer 720. After the price is transmitted to the customer 720, the customer may decide whether to purchase the ticket. If the customer decides to purchase the ticket, the customer may then secure a method of payment that is capable of being automatically processed by the computer processor, such as, but not limited to, a credit card 730. The customer may next receive a Binding Agreement of Sale, ("Agreement") 740. The Agreement may state, if a Critical Mass (x tickets or y cash value) is achieved before the Critical Date (MM/DD/YY-HH:MM:SS), then 1) the event will be booked; 2) the payment will be processed; and 3) the ticket(s) will be fulfilled to the consumer, FIG. 8. The Agreement conversely may state or imply, if the Critical Mass is not met by the Critical Date then 1) the event will NOT be booked; 2) the payment will NOT be processed; and 3) the ticket(s) will NOT be delivered to the consumer, as shown in FIG. 9.

After the customer request is processed, information relative to pre-purchased ticket is transmitted to the computer processor that is processing the request. The transmitted information may include: a confirmation to the customer that the ticket has been pre-purchased for future fulfillment and or delivery to the customer (via e-mail, regular mail, FedEx, will call, etc.); a notification that the event has not yet been booked; and a real-time registration of the sale in the form of a graphical depiction of rising Critical Mass. Real-time feedback may enhance the user experience and add an element of excitement, since customers get to see the immediate impact of their purchases and the purchases of others, especially in the fury of a popular or widely publicized event.

Figure 6:
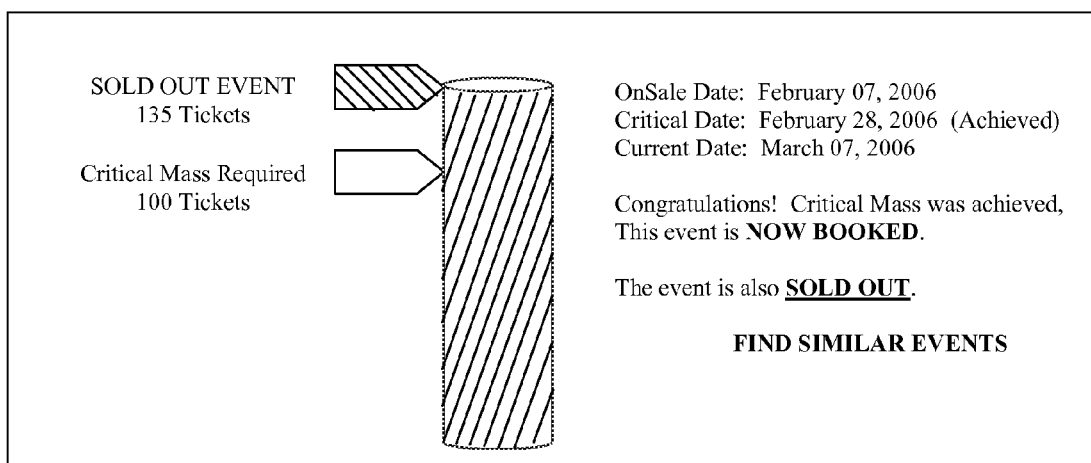
FIG. 6 shows a display that an event has been booked and is presently sold out according to an embodiment of the present invention.

After a Critical Mass is achieved and an event booked, traditional sales may continue up to the sold out event capacity, as shown in FIG. 6. A traditional sale is a sale made after an event has been booked. In the case of these non-critical ticket sales, payment may be processed at the time of sale, according to the prevailing practice.

The time between the On-Sale Time (the date and time when tickets are first available for purchase) and the Critical Date is the Critical Window, during which the Critical Mass class of tickets may be purchased. Tickets purchased after a Critical Mass has been achieved may be considered in a separate priority class for promotional purposes. Thus, a further embodiment of the present invention may include Critical Window promotions provided only to customers who help effect an event booking. Such Critical Window promotions may not necessarily be offered to those who purchase traditional tickets for an already-booked event. Critical Window promotions may include, but are not limited to: reduced ticket prices; reduced processing fees; preferred venue entry; preferred venue parking; preferred venue seating; discounts on concessions; and affinity program points.

A promoter may at any time during the Critical Window either decrease the Critical Mass criteria or increase the Critical Date criteria to help effect the booking of an event. This may favor consumers who have already purchased tickets and would not adversely affect Binding Agreement(s) of Sale already issued. In this case, the promoter controlling the sale of tickets assumes the additional risk.

Customers may likely have a personal stake in helping a promoter market an event in order to help effect a booking of that event during the Critical Window, especially customers who have already purchased tickets themselves. The viral aspect of marketing Critical Mass events enhances and feeds the sense of community surrounding them. Therefore, a further embodiment of the present invention may include easy dissemination tools for proactive consumers to notify their friends of the event, for example, via e-mail, SMS, and online social networks.

In yet another embodiment of the present invention, promoters may offer "affiliate" payments or credits to customers whose personal marketing results in the sale of tickets, especially during the Critical Window, but also after a Critical Mass is attained.

In one embodiment, customers may be given maximum information on the critical parameters and real-time status of ticketing for an event. However, in alternate embodiments, many conceivable variations may be implemented whereby information may be selectively withheld from customers. Collectively, these variations are Critical Blinds. Each blind may affect the process of pre-sales, but not the fundamental method of Critical Mass Ticketing System. Blinds may favor the promoter over the customer, and may leave customers less motivated to pre-purchase tickets.

A Critical Blind variation may include a Critical Mass Blind. The Critical Mass Blind is a variation in which the exact Critical Mass goal and/or relative progress toward that goal may be withheld from the customer. The customer may still, however, ascertain whether the Critical Mass has been met. This feature may be advantageous to a promoter who does not want to divulge the number of pre-sales required to effect a booking, either because the promoter perceives the Critical Mass to be too high or too low relative to public expectations. Implementation of the Critical Mass Blind may also have the effect of masking the degree of the lack of interest, particularly in a case where an event does not achieve its Critical Mass.

Another Critical Blind variation may include a Critical Date Blind. In this variation the Critical Date deadline may be either withheld from the customer or not set at all. The customer may still, however, ascertain whether the Critical Date has passed. This feature may be advantageous to a promoter who wants to discourage procrastination during Critical Window sales. Implementation of the Critical Date Blind may indicate to the customer that the event may go off-sale at any time and without warning.

Yet another Critical Blind variation may include a Capacity Blind. In this variation the venue capacity may be withheld from the customer, such that the customer may not know how many total tickets are available for sale. This feature may be advantageous to a promoter who wants to discourage procrastination during Critical Window or traditional sales. Implementation of the Capacity Blind may indicate to the customer that the event may sell out any time and without warning, once the Critical Mass has been attained, even in the case that Critical Mass is set at capacity.

Still another Critical Blind variation may include a Venue Blind. In this variation the exact venue name and location may be withheld from the customer, and only a general locale may be given. For example, "Venue to be announced later, within x distance of postal code y." Implementation of the Venue Blind may be advantageous to a promoter who wants to gauge interest in an event before selecting an appropriately sized or priced venue. In this variation, after the Critical Mass is achieved, the event is guaranteed, but may not be necessarily booked. Booking may occur instead when ticket sales level off and the promoter has a sense of the appropriate venue. Once booked, payments may then be processed, tickets may be fulfilled to the customer, and any remaining ticket sales may be capped at the booked venue capacity.

Still another Critical Blind variation may include an Event Date Blind. In this variation the exact date and time for an event may be withheld from the customer, and only a general but reasonable date range may be given. For example, "Date and time to be announced later, within the range MM/DD/YY to MM/DD/YY." This feature may be advantageous to a promoter using, in conjunction, Venue Blind ticketing or to a promoter that is booking a touring event.

In any blind variation, payments may not be processed nor may tickets be fulfilled and delivered until the event is booked and guaranteed to occur at a given location, date, and time.

In the situation where resources are limited for a particular event, such as a talent act that can perform only for a limited number of shows, or a film that has only a certain number of prints, a further variation may allow customer constituencies to bid for preference by proving a greater demand than other constituencies. In a further embodiment of the present invention, a promoter may place one or more proposed bookings in competition with one another using the Critical Mass methodology. Each pre-sale may share the same on-sale date, Critical Mass criteria, and Critical Date criteria. The constituency that achieves the highest number of tickets sold by the Critical Date wins the bid for the event. However, if no constituency achieves the Critical Mass by the Critical Date then no event may be booked.

In the case of more than two constituencies bidding for an event, the promoter may specify that multiple shows with the highest pre-sales may be booked, but not all shows. For example, the top three of five parties may become eligible to book the limited engagement event.

Although specific embodiments of the present invention have been described above in detail, the description is merely for purposes of illustration. Various modifications of, and equivalent steps corresponding to, the disclosed aspects of the exemplary embodiments, in addition to those described above, can be made by those skilled in the art without departing from the spirit and scope of the present invention, the scope of which is to be accorded the broadest interpretation so as to encompass such modification and equivalent structures.

What is claimed is:

1. A computer-implemented method of determining a booking of an event by pre-selling tickets to the event using a central ticket controller, the method comprising:

executing, using one or more computer systems, executable instructions to perform at least the steps of:

a) receiving a critical mass criteria and a critical date criteria for an event to set up a pre-selling of tickets for the event such that if the critical mass criteria and the critical date criteria are not satisfied, the event will not occur and any pre-purchased tickets for the event will be canceled, the critical mass criteria specifying, at least:
 a threshold number of tickets to be sold;
 a threshold total cash value of tickets to be sold independent of the threshold number of tickets to be sold; and
 that the critical mass criteria comprises exceeding both the threshold number of tickets to be sold and the threshold total cash value of tickets sold;
b) receiving a request to pre-purchase a ticket of the event from a user, wherein the request to pre-purchase a ticket includes payment information to be used to purchase the ticket;
c) processing the request to pre-purchase a ticket for the event, wherein processing of the pre-purchase request includes storing the payment information included with the request for later processing if the critical mass and critical date criteria are achieved, wherein the user is not charged for the ticket unless the critical mass and critical date criteria are achieved;
d) providing information about a future fulfillment of the ticket to the user, the information about the future fulfillment comprising a notification that the event has not yet been booked distinct from a notification of cancellation, the notification that the event has not yet been booked including a presentation of conditions for the future fulfillment including at least the critical mass criteria, the critical date criteria, and a relationship between the critical mass criteria and the critical date criteria; and
e) triggering the booking of the event when the critical mass and critical date criteria are achieved, the triggering of the booking of the event further comprising:
 completing the sale of each pre-purchased ticket for each of a plurality of users that requested to pre-purchase a ticket to the event; and
 booking a venue for the event.

2. The method of claim 1, wherein the critical mass criteria is defined as a volume of sales of tickets for the event.

3. The method of claim 1, wherein the critical date criteria is a date and time of day by which the critical mass must be attained to book the event.

4. The method of claim 1, wherein the event is an activity that regulates admission by purchasing a ticket or a secured reservation.

5. The method of claim 1, wherein the step of processing the request comprises:
 under control of one or more computer systems configured with executable instructions,
 a) using an on-line merchant processor model to submit customer information;
 b) sending customer information to pre-purchase the ticket to the central ticket controller;
 c) transmitting a purchase price from the central ticket controller to a customer;
 d) securing a method of payment that is capable of being automatically processed by the computer processor; and
 e) receiving a binding agreement of sale.

6. The method of claim 5, wherein the binding agreement of sale provides that if the critical mass criteria is satisfied before the critical date arrives, then the event will be booked, the payment will be processed, and the ticket will be fulfilled to the customer.

7. The method of claim 5, wherein the binding agreement of sale provides that if the critical mass criteria is not satisfied before the critical date arrives, then the event will not be booked, the payment will not be processed, and the ticket will not be fulfilled to the customer.

8. The method of claim 1, wherein the step of transmitting information comprises:
 under control of one or more computer systems configured with executable instructions,
 a) confirming to a customer that the ticket has been pre-purchased for future fulfillment;
 b) notifying the customer that the event has not yet been booked; and
 c) showing a real-time registration of a sale.

9. The method of claim 1, further comprising the step of providing a payment or a credit to a customer for engaging in a personal marketing of an unbooked event that results in a ticket sale.

10. The method of claim 1, further comprising the step of withholding selective information from a customer about the pre-sale of a ticket for the event, wherein the information withheld from the customer is selected from a group consisting of critical mass criteria, critical date criteria, venue capacity, event venue, and event date.

* * * * *